Nov. 19, 1929.     W. S. GOELLER     1,736,529
BUSHING REMOVER AND REPLACER
Filed May 14, 1928
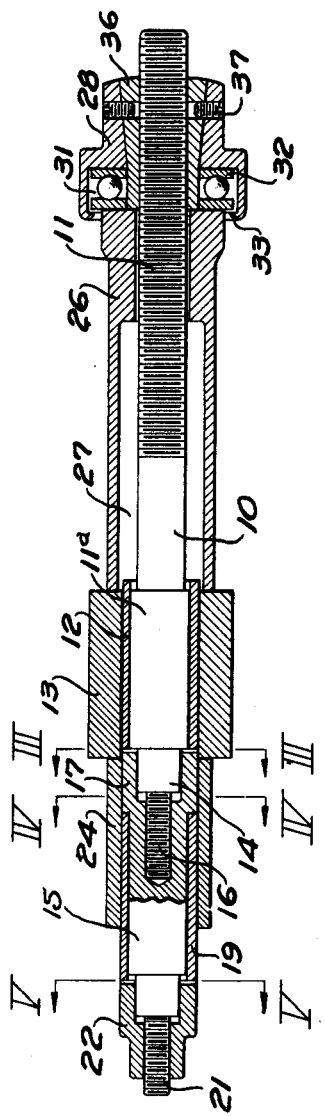
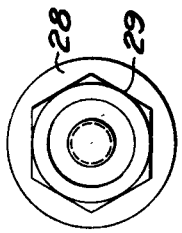
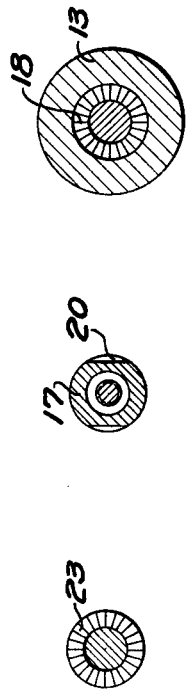
Inventor
WILLIAM S. GOELLER.
By Johnston & Jennings
Attorney Patented Nov. 19, 1929

1,736,529

UNITED STATES PATENT OFFICE

WILLIAM S. GOELLER, OF BIRMINGHAM, ALABAMA

BUSHING REMOVER AND REPLACER

Application filed May 14, 1928. Serial No. 277,711.

My invention relates to a device for removing and replacing bushings in a body, such as automobile spring shackle bushings, and has for its object the provision of a device of the character designated which shall be effective for expeditiously removing an old bushing and replacing it with a new one at one operation.

A still further object of my invention is to provide a device of the character designated, especially adapted for replacing split bushings and which includes a means for preventing the new bushing from spreading and being damaged when forced into place.

A still further object of my invention is to provide a bushing remover and replacer, embodying a mandril having bushing engaging means and thrust means to force a bushing into and out of place and which shall include novel and effective means to prevent turning of the mandril during the operation.

In accordance with my invention, I provide a sectional mandril having a portion fitting snugly within the old bushing to be removed and an engaging portion bearing against one end of the old bushing and another portion engaging the new bushing replacing the old. The new bushing also fits snugly around its portion of the mandril. The portions of the mandril fitting snugly within the bushings insure that the engaging portions are properly aligned with the old bushing to force it outwardly and the new bushing to force it inwardly without any manipulation on the part of the workman using the tool. Both of the bush engaging portions are knurled so as to engage the bushings and prevent turning of the mandril when pressure is applied to the opposite end to pull the mandril through the body which is being bushed. A forcing nut is employed on the mandril and a ball bearing is interposed between the forcing nut and a suitably arranged thrust sleeve to minimize friction and reduce the tendency for the mandril to turn.

A device embodying features of my invention is illustrated in the accompanying drawing, forming a part of this application, wherein Fig. 1 is a longitudinal sectional view of the device and showing its operation in removing and replacing a bushing;

Fig. 2 is an end view of the device;

Fig. 3 is a sectional view along the line III—III of Fig. 1;

Fig. 4 is a view taken along the line IV—IV of Fig. 1; and

Fig. 5 is a view taken along the line V—V of Fig. 1.

Referring now to the drawings, I show a mandril 10 having a threaded end portion 11, the threads extending for a considerable distance along the mandril. At 11$^a$ is shown a somewhat enlarged body portion which fits snugly within an old bushing 12 which is being removed from a body 13, such as a portion of an automobile frame.

Beyond the enlarged portion 11$^a$ of the mandril 10 is a reduced portion 14 and a threaded end portion 16 of still smaller diameter. When the mandril 10 has been inserted through the old bushing 12, as shown, a bushing engaging member 17 is screwed on to the end 16. The bushing engaging member 17 fits snugly within the hole for the bushing 12 and is provided on its end adjacent the bushing 12 with ribs or serrations 18 so as to present a knurled surface to the bushing 12 and prevent turning of the mandril when being used to force the bushing outwardly.

The bushing engaging member 17 is provided with an extended body portion 15 around which snugly fits a new bushing 19 replacing the old bushing 12. The extended portion 15 is provided with an outer reduced threaded end 21 upon which is screwed a nut 22 of the same diameter as the bushing and engaging the new bushing 19 to force it in place. The nut 22 is provided with ribs or serrations 23 to engage the bushing 19 and to aid in holding the mandril against turning.

In order to prevent the new bushing from spreading when being forced into place, I provide a sleeve 24 which fits snugly around the new bushing and which is held against the body 13 by the operator when using the tool. This feature is very important, especially when inserting split bushings, as it holds them in true cylindrical form and properly enters them in the body 13 when being inserted.

On the other side of the body 13, the mandril 10 is provided with a thrust sleeve 26 bearing against the body 13 and hollowed out at 27 to receive the old bushing 12. On the threaded portion 11 of the mandril 10 is provided a thrust nut 28 having a hexagonal head 29 to be operated with a wrench and force the thrust sleeve 26 against the body 13. In order to minimize friction between the thrust nut 28 and the thrust sleeve 26, the nut 28 is hollowed out at 31 and a ball bearing 32 is inserted therein. The ball bearing 32 is held in place by peening over the nut at 33. In order to provide longer life for the nut 28, I provide it with an inner conical threaded sleeve 36, held in place by screws 37. Thus when the threads become worn in the sleeve 36 it may be replaced and the nut is as good as new.

From the foregoing description, the operation of my improved device will be apparent. When the mandril 10 is first inserted through the body 13 and old bushing 12, the bushing engaging member 17 is screwed in place on the mandril, the member 17 being flattened at 20 whereby a wrench may be employed to tighten it on the mandril. The new bushing 19 is next placed on the extended portion 18 and the nuts 22 screwed on the threaded end 21. The thrust sleeve 26 is next placed over the other end of the mandril and the thrust nut 28 screwed on to force the sleeve against the body 13. The portion 11ª snugly fitting within the old bushing 12 insures that the thrust member 17 and new bushing 19 are properly aligned without any adjustment to perform the work.

As the old bushing 12 is being forced out, the entire strain is taken by the bushing engaging member 17 and there is no strain on the new bushing 19. During this time the knurled portion of the bushing engaging portion 17 so increases the friction, that the mandril does not turn while the ball bearing 32 minimizes friction between the thrust nut 28 and sleeve 26. As the new bushing 19 is being forced in place, the knurled portion of the nut 22, engaging the bushing 19, holds the mandril against turning, and the sleeve 24 insures that the new bushing 19 is not deformed.

From the foregoing it will be apparent that I have devised an improved bushing remover and replacer, simple of design and easy of operation and by means of which bushings may be removed and replaced with dispatch and without danger of injuring the bushings.

While I have shown my invention in but one form, it will be obvious to those skilled in the art that it is not so limited but is susceptible of various changes and modifications without departing from the spirit thereof, and I desire therefore that only such limitations shall be placed thereupon as are imposed by the prior art, or as are specifically set forth in the appended claims.

What I claim is:

1. A device for removing and replacing bushings in a body at one operation, comprising a mandril having a portion adapted to fit snugly within the old bushing to be removed, a detachable bushing engaging member secured to one end of the mandril and adapted to bear against one end of the old bushing to be removed on one side of the body, said detachable bushing engaging member having an extended portion adapted to fit snugly within the new bushing replacing the old, a member secured to the outer end of the detachable bushing engaging member and adapted to bear against the new bushing, a thrust sleeve surrounding the mandril on the other side of the body and adapted to bear against the body, a nut threaded on the mandril and forcing the thrust sleeve against the body to effect longitudinal movement of the mandril and pull the old bushing out of and the new one into the body.

2. A device for removing and replacing bushings in a body at one operation, comprising a mandril having a portion adapted to fit snugly within the old bushing to be removed, a detachable bushing engaging member secured to one end of the mandril and having a knurled surface adapted to bear against one end of the old bushing to be removed on one side of the hollow body, said detachable bushing engaging member having an extended portion adapted to fit snugly within the new bushing replacing the old, a member secured to the outer end of the detachable member and having a knurled surface adapted to bear against the new bushing, a thrust sleeve surrounding the mandril on the other side of the body and bearing against the body, a nut threaded on the mandril for forcing the thrust sleeve against the body to effect longitudinal movement of the mandril and pull the old bushing out of and the new one into the body, and a ball bearing between the nut and the thrust sleeve.

3. A device for removing and replacing bushings in a body at one operation, comprising a mandril having a portion adapted to fit snugly within the old bushing to be removed, a detachable bushing engaging member secured to one end of the mandril and adapted to bear against one end of the old bushing to be removed on one side of the body, said detachable bushing engaging member having an extended portion adapted to fit snugly within the new bushing replacing the old, a member secured to the outer end of the detachable bushing engaging member and adapted to bear against the new bushing, a thrust sleeve surrounding the mandril on the other side of the body and adapted to bear against the body, a nut threaded on the mandril for forcing the thrust sleeve against the body to effect longitudinal movement of the mandril and pull the old bushing out of and the new one into the body, and a sleeve adapted to fit snugly around the new bushing to prevent its spreading when being forced into the body.

In testimony whereof I affix my signature.

WILLIAM S. GOELLER.